June 10, 1941.     E. A. RUTT     2,244,727
WATER-COOLED SPOT WELDING MECHANISM
Filed Oct. 5, 1939

INVENTOR.
EDWARD A. RUTT
BY
ATTORNEYS

Patented June 10, 1941

2,244,727

UNITED STATES PATENT OFFICE 2,244,727

WATER-COOLED SPOT WELDING MECHANISM

Edward A. Rutt, Detroit, Mich., assignor to Commerce Pattern Foundry and Machine Company, Detroit, Mich., a corporation of Michigan Application October 5, 1939, Serial No. 298,003

5 Claims. (Cl. 219—4)

This invention relates to an improved spot welding apparatus, and has for its object a novel organization of the structural and operative parts of such a device, by means of which the water cooling of the electrode tip may be effectively had regardless of the specific size or length of the heating tip and of the conditions under which the divice as a whole is being operated.

A indicates the tubular central portion of the device, and B the portion of its body which is adapted to be connected with the part A through the medium of the threaded extension B' and the correspondingly threaded recess A' at the rear end of the tubular part A. At the forward end of the tubular part A is positioned the electrode terminal C, whose heating tip C' may be of any desired external shape, and whose hollowed central portion $C^2$ is provided with a shoulder or inclined forward end $C^3$, for the purpose which will hereinafter be enlarged upon.

The body portion B has two centrally projecting tubular extensions, as E and F, one, as for example, E, being the inlet for the cooling water, and F the outlet therefor after the cooling water has served its function. Within the chamber D into which the inlet E leads is positioned the piston G, from which forwardly extends the small tube H, which, slidably passing through a coaxially located aperture in the wall $B^2$, extends through the chamber F' and coaxially through the length of the tubular body A and into the recessed central portion $C^2$ of the welding tip C. The forward end of this latter is beveled or angularly cut as at H', so that when the tube and its supporting piston are in the relatively forwardly projecting position shown in Figure 1, the angularly inclined terminal portion H' thereof engages against the angularly inclined forward end $C^3$ of the recess $C^2$ in the electrode tip C, so that there is a space, as $C^4$, left unoccupied, into which water emerging through the forward end of the tube H can pass for subsequent return through the cross sectionally cylindrical space $H^3$, to the chamber F' and thence outwardly through the extension F for discharge or for cooling and re-use.

Figure 1:
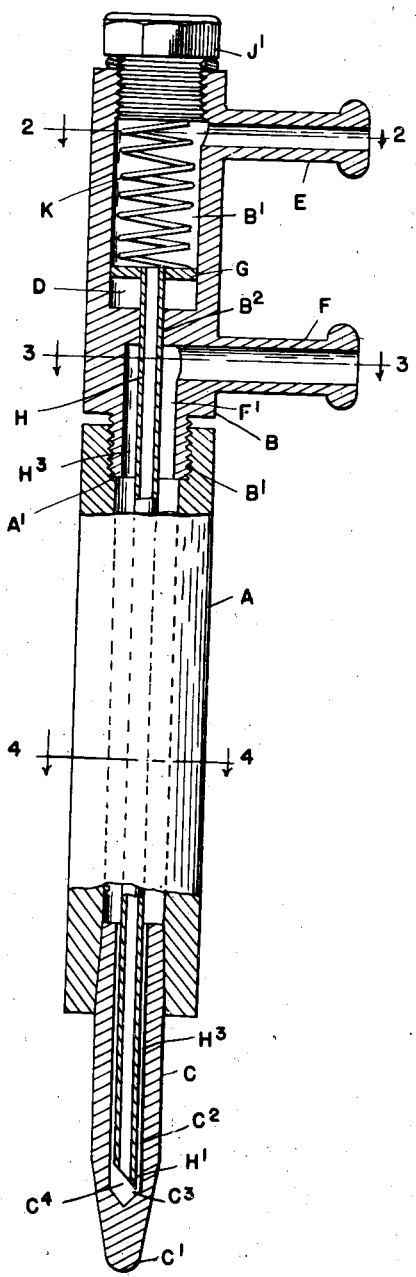
Figure 1 is a side elevational view of my improved device shown largely in section.
Figure 2:
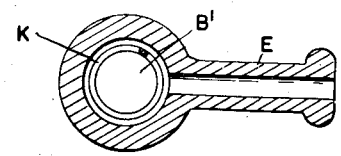
Figure 2 is a cross sectional view taken along the line 2—2 of Figure 1 and looking in the direction of the arrows there shown.
Figure 3:
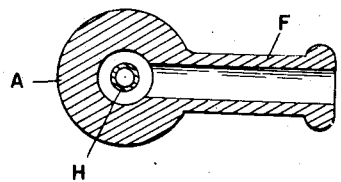
Figure 3 is a similar cross-sectional view taken along the line 3—3 of Figure 1 and looking in the direction of the arrows there shown.
Figure 4:
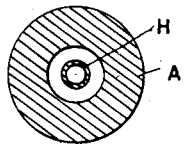
Figure 4 is a similar cross-sectional view taken along the line 4—4 of Figure 1, and looking in the direction of the arrows there shown.
Figure 5:
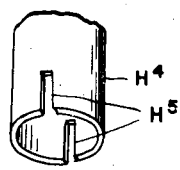
Figure 5 is a fragmentary perspective on an enlarged scale of the lower end of a cooling water tube suggesting a possible variant contouring of the discharge end thereof.

As suggested in fragmentary Figure 5, in place of the beveling of the end of the tube H, as at H' in Figure 1, a straight cut end for the tube H may be resorted to, the vent for the cooling water being furnished by the laterally positioned kerfs $H^5$ in the wall of the tube $H^4$.

Whatever be the terminal form for the cooling water tube H, it will be obvious that as the water emerges therefrom into the space $C^4$ in the recess of the tip C, it will thereafter flow back, through the cross-sectionally annular space $H^3$ between the outer surface of the tube H and the inner surface of the bore in the central body A, to the chamber F' and thence through the outlet connection F.

If the tube H were fixedly positioned within the tubular body A and the electrode tip C, slight variances in the positioning of its forward end relatively to the bore in the electrode tip C would often result in an impairing variation in the water-emergence space $C^4$ at the beveled forward end H' of the small tube, and a diminution in the degree of the effective cooling of the electrode tip would result. To obviate this, I provide at the rearward end of the device as a whole, and of the body member B, a removable nut or screw threaded plug, as J', through which access is had to the interior of the chamber D, and between this plug and the adjacent face of the piston G I position a spring, as K, whose tendency is to yieldingly project the piston G and its carried tube H as far forward within the chamber as the length of the small tube H permits, and as determined by the engagement of the beveled forward end H' thereof against the inner face of the bore $C^2$ of the electrode tip C. In addition to the influence of this spring, and indeed without it under some circumstances, the pressure of the entering flow of water through the inlet E acts to forwardly project the piston and its supported tube, the vent therefor being the channel afforded the water by the relatively small tube opening in the center of the piston G. Thus between the water pressure and the action of the spring K, the forward end of the tube H is uniformly though yieldingly held in the desired position of potential discharge at the inner end of the recess $C^2$ in the electrode tip C. Obviously the degree of pressure exerted by the spring K may be varied, as desired, by the substitution of a spring of greater or less strength, effected through its removal and insertion respectively within the chamber B' when the threaded plug J' is removed.

What I claim is:

1. Means for reducing the temperatures of a spot welding electrode during its operative activity, comprising, in combination with a tubular central body portion therefor and a centrally recessed electrode tip positioned at one end thereof, a plurally chambered member connected with the opposite end of said tubular central portion provided with inlet and outlet connections for a cooling stream of fluid, a piston engaging within one of the chambers of said last named member, a tube carried by said piston and extending forwardly therefrom spacedly through said tubular central body, and a spring positioned within that one of the chambers into which the fluid inlet connection leads, adapted to yieldingly project said piston and its attached tube forwardly, to effect the engagement of the forward end of said tube against the inner end of the recess in said electrode tip.

2. In a water-cooled spot welding mechanism, in combination with a tubular central portion and with a plurally-chambered attached portion, one of the chambers being provided with an inlet connection for cooling fluid and the other chamber being provided with an outlet connection, a piston located within the last named of said chambers, a water tube extending forwardly from said piston and spacedly through said tubular central portion, a spring positioned rearwardly of said piston within the first named of said chambers and adapted to forwardly project said piston and its supported water tube, whereby the latter is yieldingly projected through said tubular central portion, and a centrally recessed spot welding tip carried on the forward end of said tubular central portion, against the inner end of the recess in which the forward end of said water tube operatively engages.

3. The combination, with a recessed spot welding tip and a tubular central member upon one end of which said welding tip is positioned in axial alignment, of a water tube spacedly engaging within said tubular central member and into the recess within said welding tip, a plurally-chambered connection positioned on the opposite end of said tubular central member from that whereon said spot welding tip is located, the chambers of said connection being provided with fluid inlet and outlet apertures respectively, a piston located in that one of said chambers to which the fluid inlet is appurtenant, the rearward end of said water tube being mounted upon said piston, and a spring within said chamber adapted to yieldingly act against said piston, thereby effecting the projection of the forward end of said water tube against the inner end of the recess in said spot welding electrode tip.

4. A water-cooled spot welding electrode mechanism comprising, in combination, a plurally chambered member having fluid inlet and outlet connections respectively, a piston located in that one of the chambers which is provided with the fluid inlet connection, a spring within said chamber adapted to press said piston forwardly therewithin, a tubular body member extending forwardly from said plurally chambered member in axial alignment therewith, a water tube supported at one end by said piston and extending spacedly through said tubular body member, and a recessed spot welding tip positioned on the forward end of said tubular body member, against the inner end of the recess in which the forward end of said water tube yieldingly engages.

5. In a water-cooled spot welding mechanism, the combination, with a tubular central portion and a plurally-chambered attached portion, the latter being provided with inlet and outlet connections for cooling fluid, of a piston positioned within said attached chamber portion, a tube penetrating said piston and functioning as a stem therefor and extending spacedly axially lengthwise of said central portion, the travel of said piston and its attached tube being regulated by the flow of cooling fluid through said inlet and outlet connections in said attached chamber portion, and a centrally recessed spot welding tip carried on the forward end of said tubular central portion, against the inner end of the recess in which the forward end of said piston-supported tube tends to be projected by the pressure of the entering flow of cooling fluid upon said piston.

EDWARD A. RUTT.